No. 750,424. PATENTED JAN. 26, 1904.
W. B. BARD.
PROPULSION GEARING.
APPLICATION FILED DEC. 27, 1901.
NO MODEL. 2 SHEETS—SHEET 1.
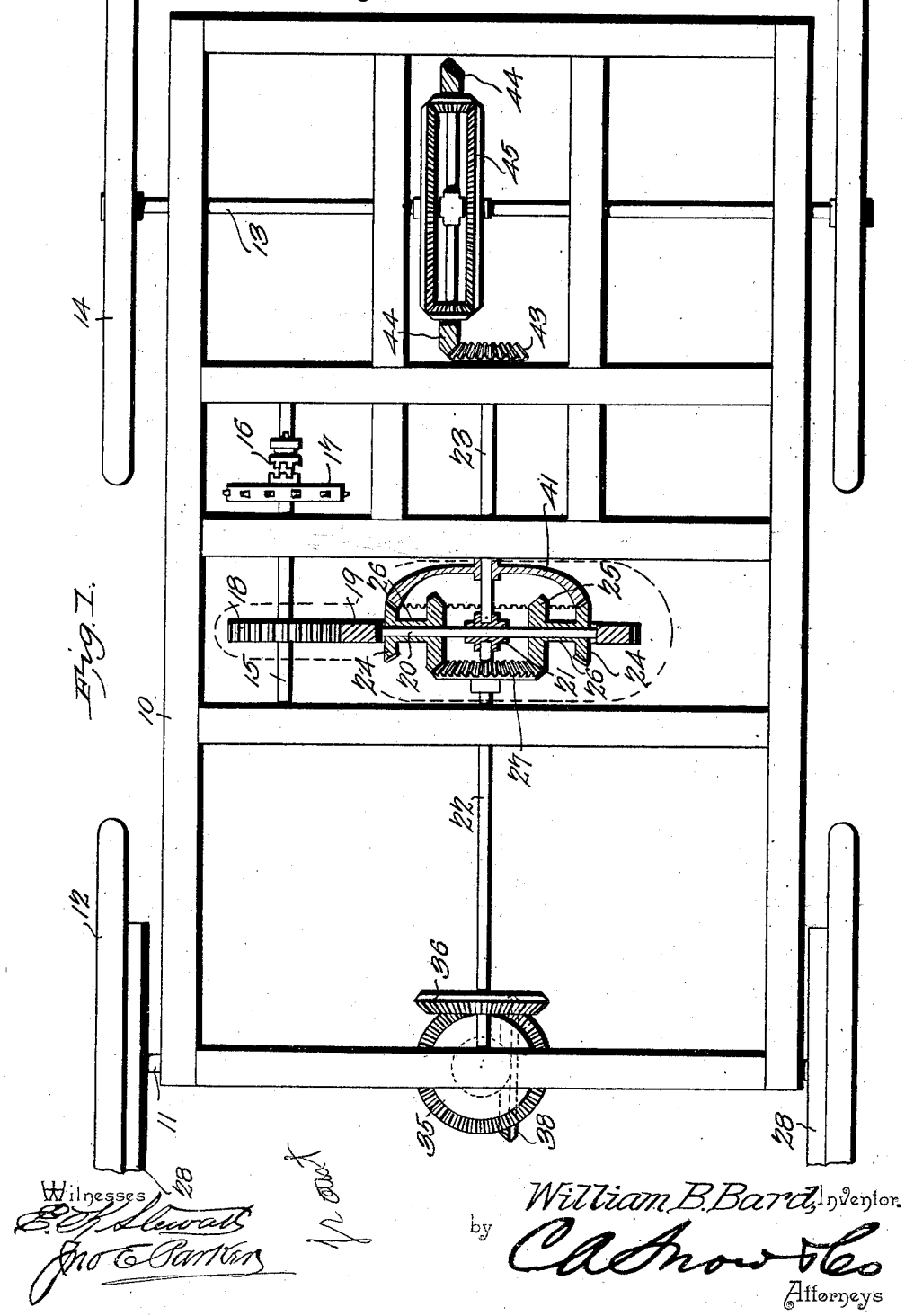

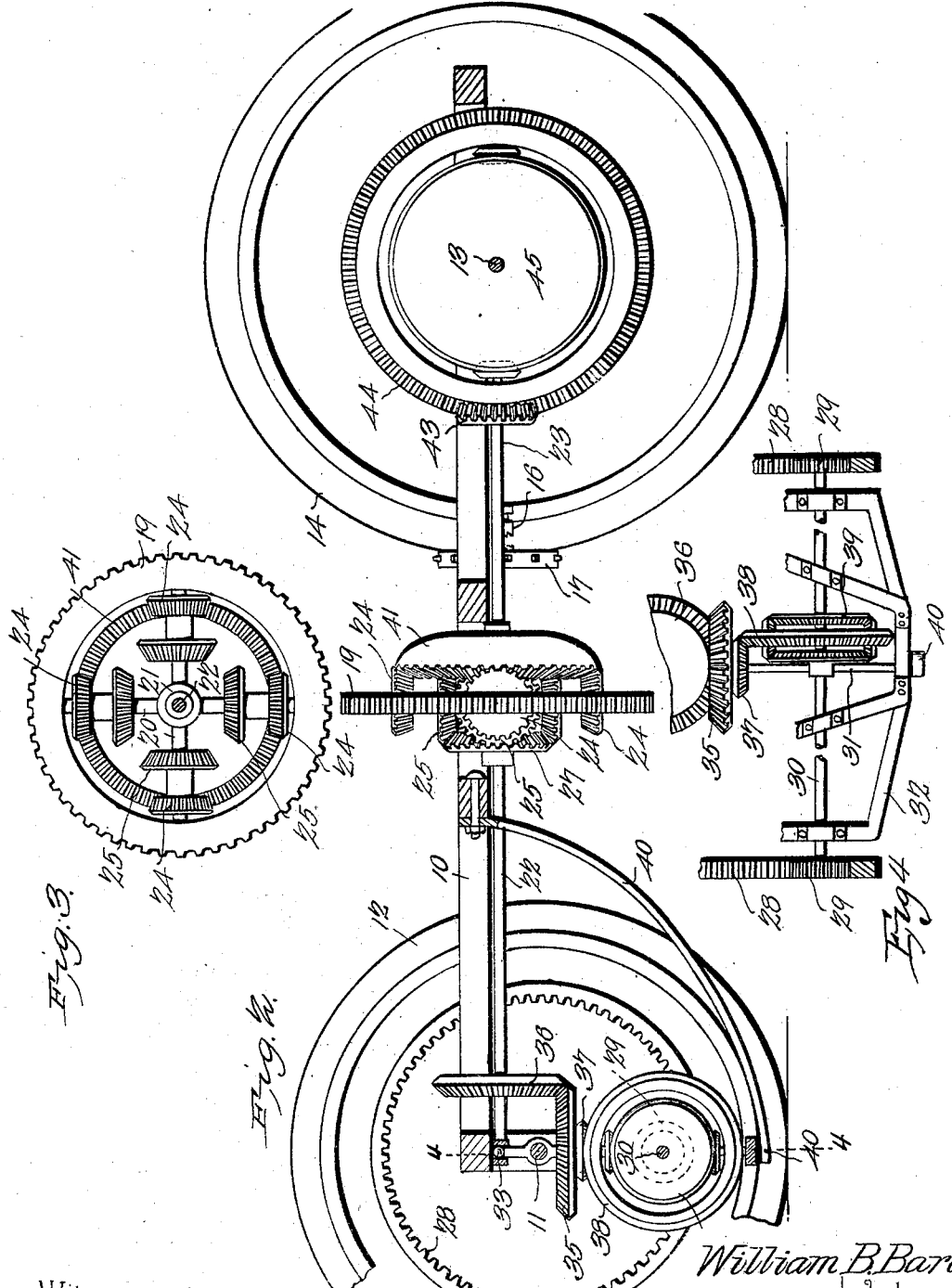

No. 750,424. Patented January 26, 1904.

UNITED STATES PATENT OFFICE.

WILLIAM B. BARD, OF ELIZABETHTOWN, PENNSYLVANIA.

PROPULSION-GEARING.

SPECIFICATION forming part of Letters Patent No. 750,424, dated January 26, 1904.

Application filed December 27, 1901. Serial No. 87,465. (No model.)

*To all whom it may concern:*

Be it known that I, WILLIAM B. BARD, a citizen of the United States, residing at Elizabethtown, in the county of Lancaster and State of Pennsylvania, have invented a new and useful Propulsion-Gearing, of which the following is a specification.

My invention relates to certain improvements in the gearing connections between the engine or other motive power of an automobile or traction-engine or the like and the front and rear wheels.

The principal object of the invention is to provide for the distribution of the power in accordance with the load supported by the wheels, so that greater or less power will be transmitted to either the front or rear wheels, depending on the construction of the vehicle.

With this and other objects in view the invention consists in the novel construction and combination of parts hereinafter described, illustrated in the accompanying drawings, and particularly pointed out in the appended claim.

In the drawings, Figure 1 is a longitudinal sectional elevation of a system of gearing arranged and constructed in accordance with my invention and showing the same applied to a vehicle. Fig. 2 is a sectional plan view of the same. Fig. 3 is a front elevation partially in section and illustrating the manner of connecting the power-shaft to the front wheels. Fig 4 is a transverse sectional elevation of a portion of the gearing on the line 4 4 of Fig. 2.

Similar numerals of reference are employed to indicate corresponding parts throughout the several figures of the drawings.

The frame 10 of the vehicle may be of any ordinary or desired construction and may form a part of the structure of an automobile, traction-engine, or other vehicle having an engine or other motive power for effecting its propulsion. The frame supports a front axle 11, having wheels 12, and a rear axle 13, having wheels 14, the diameter of the front and rear wheels being the same or being altered for any purpose rendered necessary by the construction of the vehicle or the use for which it is intended. Supported in the frame in suitable bearings is a shaft 15, carrying a clutch 16 and provided with a sprocket or other wheel 17, which receives motion from the engine or other propelling mechanism carried by the vehicle and transmits the same to the various wheels. On the shaft 15 is secured a pinion 18, intermeshing with an annular rack or gearwheel 19, having four spokes 20, secured in a central hub or block 21, which finds its bearing on the ends of two longitudinally-disposed alining shafts 22 and 23, extending from the central portion of the vehicle toward the front and rear ends thereof. On each of the spokes 20 are mounted two bevel-pinions 24 25, the pinions on each spoke being rigidly secured to or formed integral with a sleeve 26, adapted to revolve with the pinions on the spokes. On the shaft 22, which is provided with suitable bearings on the frame, is secured a bevel-gear 27, adapted to intermesh with all of the pinions 25 and being revolved by said pinions as the gear-wheel 19 is turned.

At the forward end of the vehicle the two supporting-wheels 12 are provided with internal gears 28, intermeshing with pinions 29, secured to a shaft 30, which extends transversely of the vehicle at a point below and parallel with the axle 11.

31 designates a vertically-disposed stationary shaft having its lower end rigidly secured to a supporting-bracket 32 and its upper end fitting within a recess in the frame, a ball 33 being interposed between the upper end of the shaft and the socket in order to permit of the slight turning or yielding of the wheel-frame when passing over rough roads. The shaft 31 forms a bearing for a gear-wheel 35, intermeshing with a miter-gear 36, carried by the shaft 22, and secured to and revolving with the gear-wheel 35 is a bevel-pinion 37, intermeshing with a bevel-gear 38, the latter being connected to the shaft 30 by compensating gearing 39 of ordinary construction. The shaft 31 is further held by a bracket 40, having one end secured to the lower end of the shaft and the opposite end being bolted or otherwise secured to the frame of the vehicle. The shaft 30 is made in two parts, to each of which is attached a member of the compensating gearing to permit of some freedom of movement of the supporting-wheels when turning curves. This gearing is especially adapted for use in connection with traction-engines and may be applied to advantage in all vehicles propelled by power.

Secured to the shaft 23 is a dish-shaped gear-wheel 41, having edge gear-teeth which intermesh with all of the outer pinions 24 on the spokes 20, and to the rear of the shaft 23 is secured a bevel-pinion 43, intermeshing with a bevel-gear 44, which is secured to the two-part rear axle 13 by compensating gearing 45.

In operating the mechanism power is supplied to the shaft 15 and transmitted through the pinion 18 to the gear-wheel 19. The spokes 20 of the gear-wheel 19 rotate with the latter and carry the pinions 24 and 25 around with them. As the pinions are intermeshed with the bevel-gears 27 and 41, said gear-wheels will be revolved in the same direction and at the same speed. When the vehicle is turning curves, the gearing will vary a trifle, owing to the different distances traveled by the supporting-wheels, the greatest power being transmitted through the gear-wheel 41 and shaft 23 to the rear axle, where the power is utilized to better advantage, owing to the weight of the machinery located in the rear portion of the vehicle.

The main transmitting-gearing may, if desired, be surrounded by a suitable gear-casing, as indicated by dotted lines in Fig. 1, to protect the same from dust and dirt.

One of the principal advantages incident to a construction of this character resides in the fact that in automobiles of the carriage type, where the front wheels are of smaller diameter than the rear wheels, it becomes necessary to transmit rotative movement to the front wheels at a higher rate of speed than to the rear wheels in order that the action may be uniform, this being necessary inasmuch as a small wheel will rotate a greater number of times in traveling a given distance than will a wheel of larger diameter. Aside from this the major portion of the weight is usually borne by the rear wheels, and it is desirable that these wheels, or rather their axles or shafts, shall receive the greater portion of the power. A compensating gear constructed in accordance with the present invention will accomplish these results, and its action will be automatically governed by the difference in diameter of the wheels on the same principle as the action of ordinary compensating gear between two alining wheels is governed while the wheels are turning a curve.

In applying the device to practical use the various gear-wheels may be made of different relative proportions from that herein illustrated and described and all of the compensating and other gearing may be inclosed by suitable casings or may be modified in a variety of ways within the scope of the claim without departing from the spirit or sacrificing any of the advantages of my invention.

Having thus described my invention, what I claim is—

A compensating gearing for automobiles in which the front set of wheels is of smaller diameter than the rear set of wheels, said gearing comprising a central hub, a pair of alining shafts having end bearings in said central hub, the shafts extending longitudinally of the automobile and having gearing connections with the front and rear axles thereof, a plurality of spokes radiating from the hub, a toothed rim secured to the spokes and forming a gear-wheel, a beveled gear 27 secured to the front longitudinal shaft, a beveled gear 41 of greater diameter secured to the rear longitudinal shaft, revoluble sleeves mounted on the several spokes, two beveled pinions secured to or forming a part of each sleeve, the outer of said pinions being of smaller diameter than the inner and intermeshing with the larger beveled gear 41 and the inner of said beveled pinions meshing with the smaller beveled gear 27, whereby when rotative movement is imparted to the toothed rim the gearing will automatically compensate for the difference in diameter of the front and rear wheels and will transmit rotative movement to the front wheels at a higher rate of speed than the rear wheels and will impart to said rear wheels an increase in power corresponding to the reduction in speed.

In testimony that I claim the foregoing as my own I have hereto affixed my signature in the presence of two witnesses.

WILLIAM B. BARD.

Witnesses:
    W. H. WITHERS,
    FRANK W. MILLER.